United States Patent
Hars et al.

(10) Patent No.: US 8,862,902 B2
(45) Date of Patent: Oct. 14, 2014

(54) CASCADED DATA ENCRYPTION DEPENDENT ON ATTRIBUTES OF PHYSICAL MEMORY

(75) Inventors: Laszlo Hars, Lafayette, CO (US); Donald P. Matthews, Jr., Longmont, CO (US)

(73) Assignee: Seagate Technology LLC, Scotts Valley, CA (US)

(*) Notice: Subject to any disclaimer, the term of this patent is extended or adjusted under 35 U.S.C. 154(b) by 178 days.

(21) Appl. No.: 13/098,027

(22) Filed: Apr. 29, 2011

(65) Prior Publication Data
US 2012/0278635 A1 Nov. 1, 2012

(51) Int. Cl.
*G06F 12/14* (2006.01)
*G06F 12/02* (2006.01)
*G06F 21/00* (2013.01)

(52) U.S. Cl.
CPC ............ *G06F 12/14* (2013.01); *G06F 12/0246* (2013.01); *G06F 2212/1052* (2013.01); *G06F 2212/7201* (2013.01); *G06F 21/00* (2013.01); *G06F 12/1408* (2013.01)
USPC ........................................................ 713/193

(58) Field of Classification Search
CPC ............ G06F 21/10; G06F 2221/2107; G06F 2212/402; G06F 17/00; G06F 17/30; G06F 12/02; G06F 12/06; G06F 12/14; G11B 20/00086; G11B 20/0013; G11B 20/0021; H04L 9/08; H04L 9/00; H04L 9/28; H04L 9/06; G04F 2212/40
USPC .................................................. 713/193, 190
See application file for complete search history.

(56) References Cited

U.S. PATENT DOCUMENTS

| | | | | |
|---|---|---|---|---|
| 5,499,296 A | | 3/1996 | Micali | |
| 5,659,614 A | * | 8/1997 | Bailey, III | 713/165 |
| 5,832,493 A | * | 11/1998 | Marshall et al. | 707/697 |
| 6,898,288 B2 | * | 5/2005 | Chui | 380/278 |
| 6,904,150 B1 | * | 6/2005 | Dent | 380/28 |
| 7,127,612 B1 | * | 10/2006 | Ishibashi | 713/169 |
| 7,284,133 B2 | * | 10/2007 | Watanabe et al. | 713/189 |
| 7,461,232 B2 | * | 12/2008 | Nicolai | 711/207 |
| 7,530,108 B1 | * | 5/2009 | Cocchi et al. | 726/26 |
| 7,810,133 B2 | * | 10/2010 | Carter et al. | 726/2 |
| 8,060,757 B2 | * | 11/2011 | Goettfert et al. | 713/193 |
| 8,117,464 B1 | * | 2/2012 | Kogelnik | 713/193 |

(Continued)

OTHER PUBLICATIONS

"IEEE P1619.2/D16 Draft Standard for Wide-Block Encryption for Shared Storage Media," IEEE Standards Draft, May 2010, pp. i-vii & 1-81, IEEE.

*Primary Examiner* — Eleni Shiferaw
*Assistant Examiner* — Nelson Giddins
(74) *Attorney, Agent, or Firm* — Hall Estill Attorneys at Law

(57) ABSTRACT

Apparatus and method for providing data security through cascaded encryption. In accordance with various embodiments, input data are encrypted in relation to a first auxiliary data value to provide first level ciphertext. The first level ciphertext are encrypted using a second auxiliary data value associated with a selected physical location in a memory to produce second level ciphertext, which are thereafter stored to the selected physical location. In some embodiments, migration of the stored data to a new target location comprises partial decryption and re-encryption of the data using a third auxiliary data value associated with a new target physical location to produce third level ciphertext, and the storage of the third level ciphertext to the new target physical location.

15 Claims, 6 Drawing Sheets

(56) References Cited

U.S. PATENT DOCUMENTS

| | | | |
|---|---|---|---|
| 8,165,302 B2* | 4/2012 | Pedlow, Jr. | 380/277 |
| 2002/0073326 A1* | 6/2002 | Fontijn | 713/190 |
| 2003/0037248 A1* | 2/2003 | Launchbury et al. | 713/193 |
| 2003/0061499 A1* | 3/2003 | Durrant | 713/189 |
| 2003/0200454 A1* | 10/2003 | Foster et al. | 713/200 |
| 2004/0091114 A1* | 5/2004 | Carter et al. | 380/259 |
| 2004/0260921 A1* | 12/2004 | Treadwell | 713/150 |
| 2005/0050342 A1* | 3/2005 | Boivie et al. | 713/193 |
| 2005/0201177 A1* | 9/2005 | Shiraishi et al. | 365/222 |
| 2006/0005047 A1* | 1/2006 | Lekatsas et al. | 713/193 |
| 2006/0015946 A1* | 1/2006 | Yagawa | 726/32 |
| 2007/0043940 A1 | 2/2007 | Gustave et al. | |
| 2007/0055894 A1* | 3/2007 | Osaki | 713/193 |
| 2007/0071234 A1* | 3/2007 | Lagrange et al. | 380/28 |
| 2007/0136607 A1* | 6/2007 | Launchbury et al. | 713/190 |
| 2008/0005590 A1* | 1/2008 | Kasahara et al. | 713/193 |
| 2008/0022396 A1* | 1/2008 | Kado | 726/19 |
| 2008/0055617 A1* | 3/2008 | Savagaonkar | 358/1.9 |
| 2008/0065905 A1* | 3/2008 | Salessi | 713/193 |
| 2008/0162937 A1* | 7/2008 | Kohlenberg et al. | 713/171 |
| 2008/0189485 A1 | 8/2008 | Jung et al. | |
| 2008/0301467 A1* | 12/2008 | Saito | 713/190 |
| 2009/0103722 A1* | 4/2009 | Anderson et al. | 380/44 |
| 2009/0110191 A1* | 4/2009 | Sanvido et al. | 380/44 |
| 2009/0158085 A1* | 6/2009 | Kern et al. | 714/6 |
| 2009/0164696 A1* | 6/2009 | Allen et al. | 711/1 |
| 2009/0164702 A1* | 6/2009 | Kern | 711/103 |
| 2009/0193184 A1* | 7/2009 | Yu et al. | 711/103 |
| 2009/0214044 A1* | 8/2009 | Kinoshita | 380/283 |
| 2009/0296937 A1* | 12/2009 | Suu et al. | 380/277 |
| 2010/0088525 A1* | 4/2010 | Ureche et al. | 713/193 |
| 2010/0138670 A1* | 6/2010 | Shinbori et al. | 713/189 |
| 2010/0205502 A1* | 8/2010 | Tanaka et al. | 714/749 |
| 2010/0217970 A1* | 8/2010 | Carter et al. | 713/150 |
| 2010/0228904 A1* | 9/2010 | Buhr et al. | 711/102 |
| 2010/0229005 A1* | 9/2010 | Herman et al. | 713/193 |
| 2010/0299534 A1* | 11/2010 | Shim et al. | 713/189 |
| 2011/0119538 A1* | 5/2011 | Ipek et al. | 714/719 |
| 2011/0154060 A1* | 6/2011 | Guyot et al. | 713/193 |
| 2011/0208979 A1* | 8/2011 | Saarinehn et al. | 713/193 |
| 2012/0005486 A1* | 1/2012 | Watanabe | 713/193 |
| 2012/0063592 A1* | 3/2012 | Spalka et al. | 380/28 |

* cited by examiner

CASCADED DATA ENCRYPTION DEPENDENT ON ATTRIBUTES OF PHYSICAL MEMORY

SUMMARY

Various embodiments of the present invention are generally directed to enhancing data security in a memory through a cascaded encryption operation that uses auxiliary data selected in relation to one or more attributes of physical memory at which the encrypted data are stored.

In accordance with some embodiments, a method generally comprises encrypting input data in relation to a first auxiliary data value to provide first level ciphertext. The first level ciphertext are encrypted in relation to a second auxiliary data value associated with a selected physical location in a memory to provide second level ciphertext. The second level ciphertext are thereafter stored in the selected physical location in the memory.

These and other features and advantages which characterize the various embodiments of the present invention can be understood in view of the following detailed discussion and the accompanying drawings.

DETAILED DESCRIPTION

Figure 1:
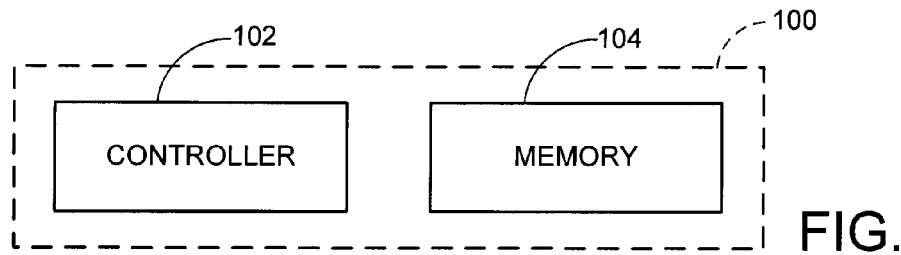
FIG. 1 is a generalized functional representation of an exemplary data storage device operated in accordance with various embodiments of the present invention.

The present disclosure generally relates to data security. Data encryption can be employed to encrypt data stored to a memory of a data storage device in order to reduce the ability of an unauthorized party to access the stored data. Encryption generally involves the transformation of an input data sequence (plaintext) to an encrypted output data sequence (cyphertext) using a selected encryption algorithm (cipher). The cipher may utilize one or more pieces of auxiliary data (e.g. keys, initial values, tweak values) to effect the transformation. In this context, plaintext can include data that have been previously encrypted by an upstream encryption process.

Some types of memory devices are configured to write each new version of a particular set of data to a different location within a memory, such as in the case of flash memory arrays. Blocks of memory cells that store older versions of the data can be scheduled for erasure using a background garbage collection operation. If such erasures have not yet taken place at the time of a system attack, an attacker may be able to locate multiple versions of the same data, and use this information to help break a particular cipher and recover the stored data.

Even if prior versions of a set of data have been erased and overwritten with new data, a number of laboratory techniques can be used by an attacker to detect previously stored data signatures, which may leave the system open to the recovery of the stored data. Such techniques can also be used by an attacker to gain valuable information about the stored data, such as the number of recent data changes and the extent of these changes, the types of software applications that have been used to handle the data, the kind and organization of the file system, the presence of data compression, and so on.

One particular security concern is malleability: if an attacker is able to locate a current version and a previous version of a particular set of data, the attacker may be able to use similarities between these respective data sets to recover the data or uncover valuable related information. For example, swapping two versions of a data set in a storage medium may cause a restoration of an earlier version of the data, even if the attacker does not know which set is current.

Accordingly, various embodiments of the present invention are generally directed to an apparatus and method for securing data stored to a memory of a data storage device through the use of cascaded (multi-level) data encryption. At least one of the encryption levels uses secret auxiliary data, such as a secret key not generally available external to the storage device. The secret data incorporates information associated with one or more attributes of the physical location in the memory at which the data are stored. Such attributes may include the physical block address of the storage location, write/erase counts, timestamp information associated with the physical write to the storage location, and so on. Any number, type and combinations of suitable attributes can be used, so that this list is merely exemplary and is not limiting.

Migration of the data from a first location to a second location in the memory may involve a partial decryption of the data so that less than all of the encryption levels are removed, followed by the additional encryption of the data using auxiliary data selected in relation to an attribute associated with the second location. In some cases, a new secret key may be used that is associated with the second location. In this way, multiple versions of the same data sets concurrently resident in different locations in the memory will have been differently encrypted using different attribute data, and will therefore not be easily detectable by an attacker.

Without limitation and merely by way of illustration, in some embodiments the first level of encryption can be configured in such a way as to depend on a derived key associated with a range of logical block addresses (LBAs). Such encryption may also depend, e.g., may be initialized or tweaked by, individual LBA values associated with the data, as desired. In this way, the same data at different locations will be encrypted as different ciphertext blocks. While different keys for every individual LBA can be used, such may be unwieldy and indeed, unnecessary if a band approach is used. A tweak or initial value for the cipher can be used, including a publicly known value, as desired.

In virtualized storage devices (where the logical block address does not always correspond to a constant physical address) older versions of the data may linger in unmapped or unerased physical locations. If the beginnings of these data versions are the same, the beginnings of the corresponding ciphertext may also be the same, which may permit an attacker to identify two (or more) versions of the same data in the virtualized storage medium, and derive some side information about the activities of the user, the software, etc. This may enable the attacker to restore a previous version of the data by swapping the ciphertext blocks of the old and the new versions of the data.

To make the identification of partially changed data blocks more difficult for an attacker, various embodiments presented herein can employ a second level of encryption. This second level of encryption may use one or more keys stored in the storage device hardware, and these encryption algorithms may depend on auxiliary data that depend on attributes associated with physical memory where the data are to be stored. The key values can take any number of forms, and can be used to initialize or tweak the encryption, or in some other manner. These diversify the ciphertext stored in different locations in the memory.

Although not required, storing the second level key(s) in the device hardware so that it is available to the storage device can be useful in some cases in enabling the storage device to perform optimization, housekeeping and other memory management related tasks when the user and/or host system is not present to provide any keys or other information to unlock the data, or otherwise supply information for key derivation.

These and various other features will now be discussed in greater detail. FIG. 1 shows a block diagram for a data storage device 100 in which various embodiments of the present invention can be practiced. The device 100 includes a top level controller 102 and a memory module 104. The controller 102 may be programmable or hardware based and directs I/O operations with a host device (not shown). The controller 102 may be a separate component or may be incorporated directly into the memory module 104.

Figure 2:
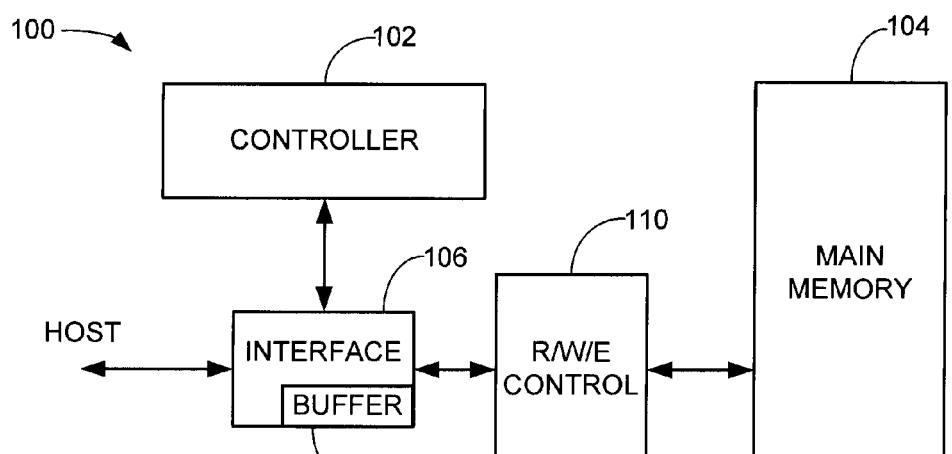
FIG. 2 is an exemplary functional block diagram of the device of FIG. 1.

FIG. 2 shows the device 100 in accordance with some embodiments. For purposes of FIG. 2, it is contemplated that the device 100 constitutes a flash memory device, such as a solid-state drive (SSD) or portable memory stick (thumb drive) that uses a flash memory array. The controller 102 uses an interface (I/F) circuit 106 with a buffer 108 to communicate with the host device. The buffer 108 may store programming and other information used by the controller during operation, and may further temporarily cache data during transfer between the host device and the memory 104. A read/write/erase (R/W/E) circuit 110 controls data transfers with the memory 104.

Figure 3:
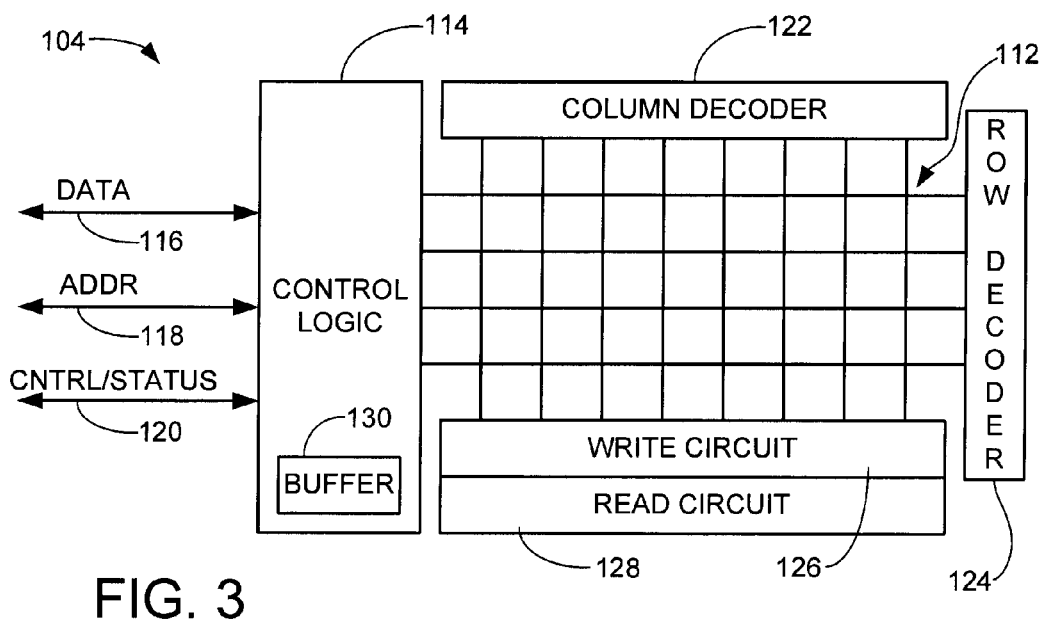
FIG. 3 illustrates read/write/erase circuitry of FIG. 2 in accordance with some embodiments.

FIG. 3 represents the R/W/E circuitry and the memory 104 in some embodiments. Data are stored as an arrangement of rows and columns of memory cells 112, accessible by various row and column control lines. Control logic 114 receives and transfers data, addressing information and control/status values along multi-line bus paths 116, 118 and 120, respectively.

Column and row decoding circuitry 122, 124 provide appropriate switching and other functions to access the cells 112. A write circuit 126 represents circuitry elements that operate to carry out write operations to write data to the cells 112, and a read circuit 128 operates to obtain readback data from the cells. Local buffering of transferred data and other values can be provided via one or more local buffers (data registers) 130.

Figure 4:
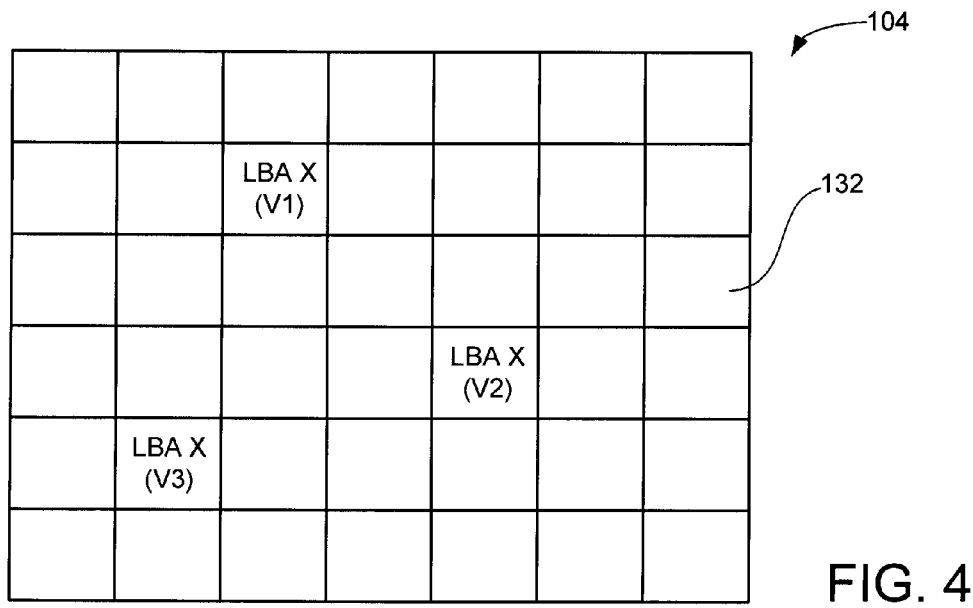
FIG. 4 illustrates a portion of the memory module of FIG. 1 in accordance with some embodiments.

FIG. 4 shows the memory 104 arranged as an array of erasure blocks 132 in accordance with some embodiments. Each erasure block 132 is formed from a number of rows and columns of flash memory cells 112. Each erasure block constitutes the smallest increment of memory that can be erased at a time. An exemplary block size might be 128 rows (pages), with each page storing 8192 bytes (8 KB). Other sizes and configurations can be used.

A full page's worth of data may be written to each page during a data write operation. Data may be supplied by the host in the form of fixed sized sectors with an associated logical address (such as a logical block address, LBA). In response, the device 100 selects an associated physical address (such as a physical block address, PBA) in the array to store the data. The PBA may include erasure block, page and bit location information.

Multiple LBAs may be written to the same page, and a given LBA's worth of data may by physically stored so as to span multiple pages. Filler bits may be appended to a selected set of input data if a full page worth of data is not supplied for writing in a given write operation. Error correction codes (such as parity bits, etc.) may be incorporated at the page level to correct errors as a full page worth of data is retrieved. Lossless data compression may also be applied to reduce the data footprint.

A new physical address may be selected for a given set of data each time that data are written to the memory 104. FIG. 4 shows a selected LBA X that has been stored to the array 104 three different times in three different locations, as versions V1-V3. The different versions may be updated versions of the LBA user data resulting from an editing operation at the host level. Alternatively, the different versions may include identical copies of the same LBA user data resulting from a garbage collection or other memory management operation by the device 100. While each of the versions V1-V3 in FIG. 4 is stored in a different erasure block 132, the same erasure block could store multiple versions of the same LBA.

Figure 5:
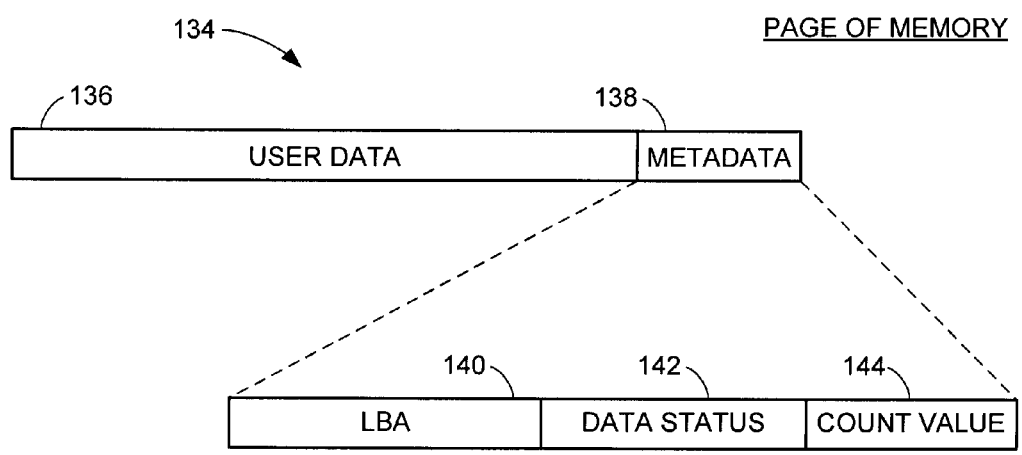
FIG. 5 provides an exemplary format for a page of memory from FIG. 4.

FIG. 5 shows an exemplary format for a page 134 of memory from the erasure blocks 132 of FIG. 4. It will be appreciated that any number of different formats for the memory can be used, so FIG. 5 is merely illustrative of one such format. In some embodiments, the page 134 is arranged to have a user data portion 136 and a metadata portion 138. The user data portion 136 is configured to store up to a selected amount of encoded host data. The metadata portion 138 stores metadata, which is control information associated with the user data portion 136. A variety of metadata formats can be used, such as data stored in a logical address (LBA) field 140, a status field 142, and one or more count value fields 144.

The LBA field 140 stores a logical address (e.g., a logical block address (LBA) value) associated with the data in the user data field 136. The data status field 142 stores data associated with the status of said user data; for example, a flag may be set to indicate that a later version of the data is stored elsewhere in the array. The count value field 144 may provide a total accumulated count of write operations that have taken place upon the associated physical address. For clarity, write operations in this context may denote data writes and/or erasures.

While the metadata can be physically stored in each page 134, it is common to store the metadata elsewhere, such as in specially designated metadata pages/fields at the end of each erasure block. Alternatively, the metadata may be stored in one or more specially designated metadata erasure blocks dedicated to this purpose, or somewhere else in a suitable location in the storage device or elsewhere. During operation, the metadata may be retrieved from non-volatile memory and placed in a local volatile cache for use by the controller 102. A logical-physical address conversion table may be generated from the metadata and stored in local memory for access by the controller.

The erasure blocks 132 are allocated on an as-needed basis, with wear leveling techniques applied in an effort to distribute writes in a nominally even fashion across the array. Data are usually written sequentially to each page in turn starting with the first page in the erasure block, so newer data will generally be present in lower (later written) pages in the block and older data will be present in higher pages (earlier written) in the block.

A cascaded encryption scheme is utilized to protect the data stored in the various pages 134 of memory. The scheme can be applied to the encoded user data in portion 136, the associated metadata in portion 138, or both. Different encryption schemes can be applied to each type of data. The memory can further be divided into bands (subgroups) with different encryption schemes, including different security levels, applied to each band.

The cascaded encryption as exemplified herein employs various encryption and decryption blocks to carry out on-the-fly encryption and decryption of the data. These blocks may be realized in software, firmware or hardware. In some embodiments, the encryption/decryption operations are carried out by the controller 102.

Figure 6:
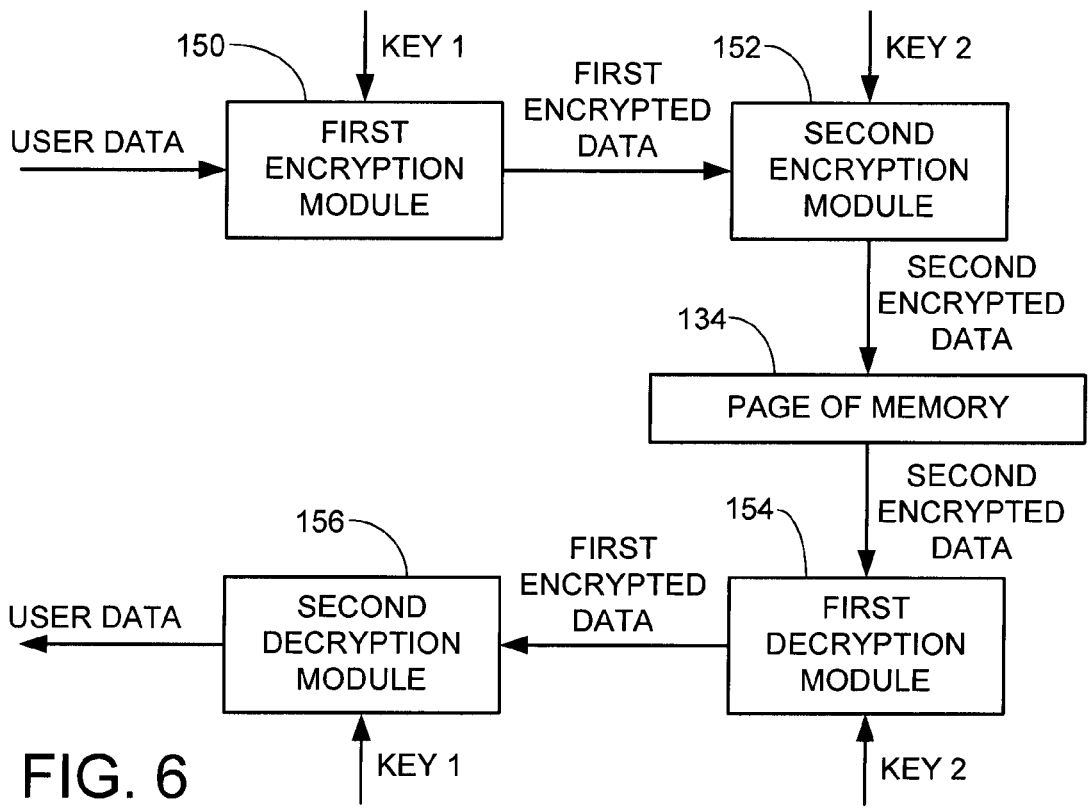
FIG. 6 depicts an exemplary encryption sequence in which double encryption is applied to data stored to a selected page of memory in accordance with some embodiments.

FIG. 6 illustrates an exemplary encryption/decryption sequence in which user data supplied by the host device are double encrypted and stored to a selected page of memory 134 during a write operation. The data are thereafter double decrypted and returned to the host during a subsequent read operation.

A first encryption module (engine) 150 applies a first level of encryption to a set of input user data using a first cipher algorithm. Initial processing of the input data may have been applied by the controller, such as error encoding and compression, prior to encryption. The first encryption module 150 applies a first level cipher in accordance with a first type of auxiliary data, such as a first level key (Key 1) to generate first level encrypted data. The first level key may include a logical address (such as a logical block address, LBA) associated with the input data. Additionally or alternatively, the first key may be a public key that is generated, known and/or discoverable outside the storage device 100. The first key may be supplied by the host at the time of the transfer of the input user data.

The first encrypted data are subjected to a second level of encryption by a second encryption module 152. The second module 152 applies a second cipher that may be the same as, or different from, the first cipher. The second cipher uses a second piece of auxiliary data, such as a hidden second key (Key 2). The second key (or other auxiliary data) is internally generated by, and remains private to, the storage device 100. The second encryption module 152 produces second level encrypted data, which are then stored to a selected page 134 in a selected erasure block 132.

During a subsequent read operation to retrieve the originally stored user data back to the host, a first decryption module 154 uses the second key to remove the second level of decryption from the encoded data. The first decryption module 154 may be the same operational block as the second encryption module 152, or may be a different module. This decryption operation reproduces the first encrypted data.

The first encrypted data are subjected to a second decryption operation by a second decryption module 156, which uses the first key to reproduce the originally stored user data. As before, the second decryption module 156 may be the same block as the first encryption module 150. The recovered data are thereafter returned to the host. While not specifically shown in FIG. 6, it will be appreciated other processing steps may be taken upon the recovered data, such as error detection and correction and data decompression, prior to the transfer of the recovered user data to the host.

The various encryption and decryption blocks of FIG. 6 can utilize any number of different ciphers, such as but not limited to counter (CTR) mode encryption, cipher block chaining (CBC) encryption, XTS mode (XOR-Encrypt-XOR based Tweaked CodeBook mode (TCB) with CipherText Stealing), and mixing layer encryption (e.g., EME2). Any suitable encryption cipher can be used, and different ciphers can be used in different locations and/or at different times. In at least some embodiments, the first auxiliary data (e.g. Key 1) is based on a logical address attribute associated with the input data, and the second auxiliary data (e.g., Key 2) is based on a physical address attribute associated with the data. While the first and second auxiliary data values used by the respective encryption modules are characterized in FIG. 6 as keys, it will be appreciated that these can be used in other ways, such as initialization vectors, tweak values, and so on.

Figure 7:
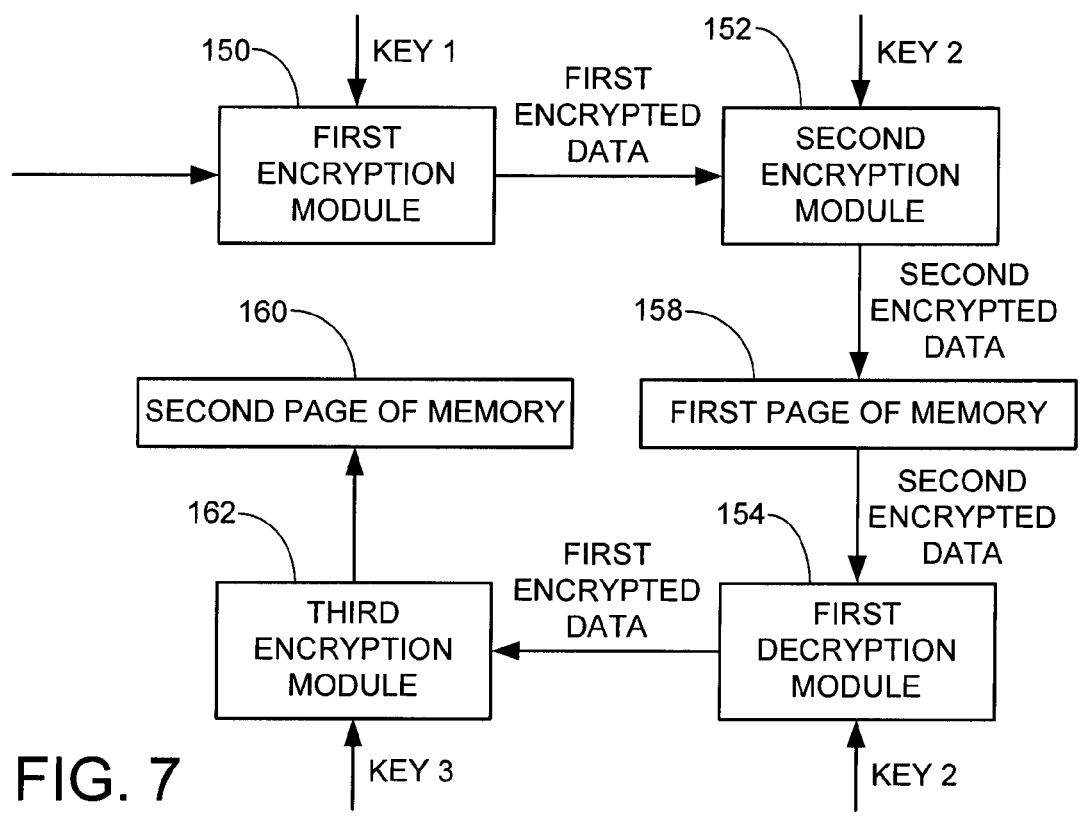
FIG. 7 depicts an exemplary encryption sequence in which double encryption is applied to data copied to a new page of memory in accordance with some embodiments.

FIG. 7 shows another cascaded encryption operation in accordance with various embodiments. In FIG. 7, data are initially stored in a first memory location, and then subsequently moved internally by the device 100 to a second memory location. This may be part of a garbage collection operation by the device, or some other memory management operation such as the updating of a larger user file that involves multiple LBAs in a read-update-write sequence.

Double encrypted data are stored to a first page of memory (denoted at 158) as discussed above in FIG. 6 using cascaded encryption blocks 150, 152. A data migration operation is subsequently carried out in which the data are moved to a second page of memory 160. It is contemplated that the first and second pages 158, 160 will be in different erasure blocks 132, but such is not necessarily required.

To subsequently copy the data to the second page 160, the first decryption module 154 from FIG. 6 is used to remove the second level of encryption from the stored data to provide the first encrypted data. A third encryption module 162 applies a different second level of encryption to the data using a third auxiliary data value, such as an encryption key (Key 3). The resulting ciphertext data are stored to the second page 160.

It will be noted that the module 162 may use the same cipher as the module 156, or may use a different cipher. If the same cipher is used, module 162 may be the same module as module 156, which in turn may be the same module as module 150. Thus, the respective operations of FIGS. 6 and 7 can be carried out by two encryption/decryption engines, one for each level. In other embodiments, a single encryption/decryption engine carries out all the requisite encryption and decryption operations represented in FIGS. 6-7 using different auxiliary data values and data flows. For example, the controller 102 in FIGS. 1-2 can be programmed to perform these operations.

It can be seen from FIG. 7 that the memory stores two copies of the same plaintext, albeit in encrypted form, in two separate physical locations. Should an attacker gain access to the contents of the respective first and second pages 158, 160, the different encryption keys applied thereto will tend to prevent the attacker from easily determining that the same core user data are stored in each of these locations. Hiding the underlying commonality of the plaintext thus increases the security of the system.

Figure 8:
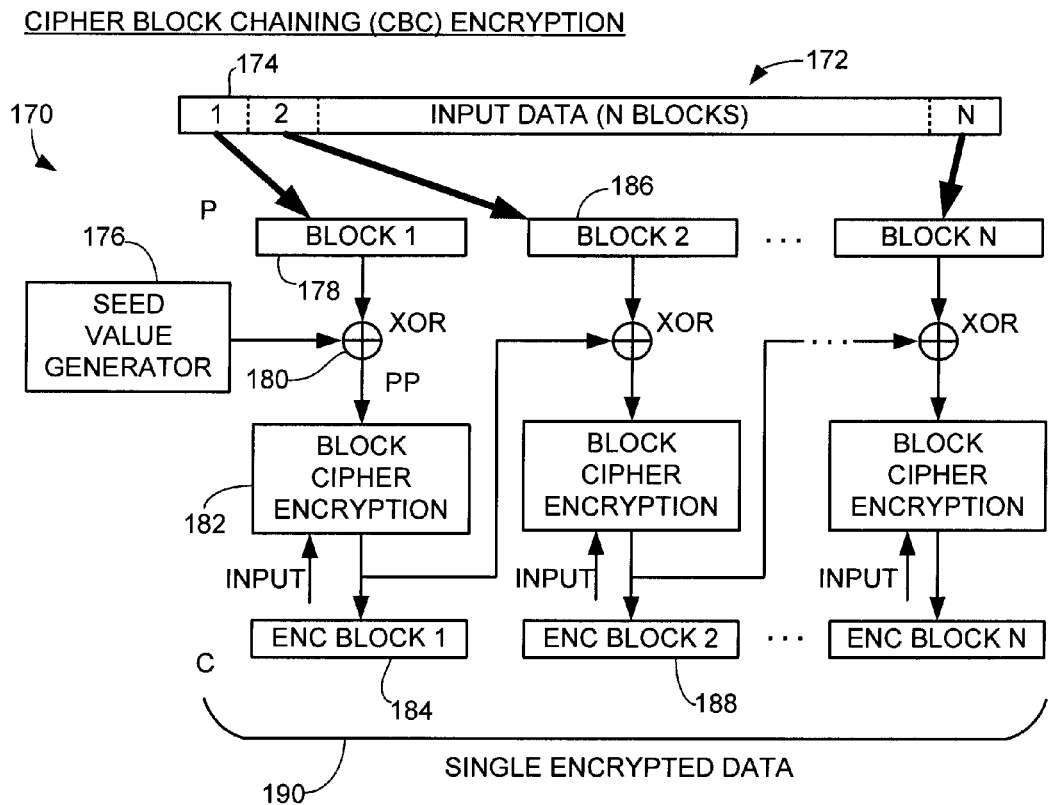
FIG. 8 depicts the use of cipher block chaining (CBC) encryption in accordance with some embodiments.

FIG. 8 shows an exemplary encryption module 170 that may be incorporated into the cascaded sequences of FIGS. 6-7. In some embodiments, the encryption module 170 corresponds to the first encryption module 150 and carries out the first level of encryption using a cipher block chaining (CBC) encryption algorithm. The CBC cipher converts the input user data (plaintext, P) to first encrypted data (ciphertext, C) using one or more key values based on logical addressing associated with the input data.

In FIG. 8, the input data are temporarily stored in a buffer memory location 172 and arranged as N sequential blocks 174, where N is a plural integer. Each of the N blocks comprises a multi-bit block of M-bits, such as 128 bits although other block sizes can be used. It is contemplated that each block will be the same size, although this is not necessarily required. Filler bits can be appended as required.

A seed value for the encryption is generated by a seed value generator 176. The seed value is a multi-bit input value that serves as an initialization vector (IV) to initiate the CBC encryption process. In some embodiments, the seed value includes a logical address associated with the input data, such as the LBA value. The seed value may additionally or alternatively include other information supplied by the host or generated internally by the device 100. It will be appreciated that this seed value constitutes at least a portion of the auxiliary data used during the encryption process.

A first selected block 178 (block 1) of the input data is logically combined with the seed value to form an M-bit result (PP). The logical combination of the selected block and the seed value can take any suitable form, such as through an exclusive-or (XOR) function 180. The output of the XOR function 180 is supplied to a block cipher encryption module 182 which carries out an encryption operation using a second input value to provide an M-bit encrypted block 184 of ciphertext (C). It is contemplated that the encrypted block will have the same number of bits as the original plaintext block 178, although such is not necessarily required.

Any suitable encryption operation can be carried out by the encryption module 182. This can include a simple XOR operation with the second input value, or a more complex cipher algorithm.

The second input value used by the block 182 can take any number of forms. In some embodiments, the second input value also uses a logical address associated with the input data, such as the LBA, although other forms of input value can be used. It will be appreciated that the input value in FIG. 8 is also an exemplary type of auxiliary data that can be used during the encryption operation.

The encrypted block 184 (enc block 1) serves as a seed for the encoding of a second plaintext block 186 (block 2) of the input data. The encrypted block 1 is logically combined using a suitable function such as an XOR with plaintext block 2, and the result is encrypted to provide a second encrypted block (enc block 2) 188. This process continues until all N blocks of input data have been encrypted, resulting in a set of single (first) encrypted data 190.

Figure 9:
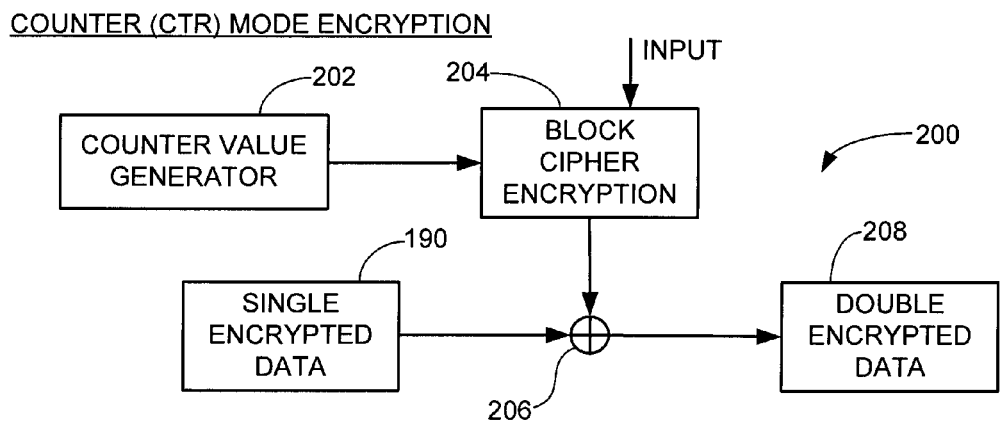
FIG. 9 shows the use of counter (CTR) mode encryption in accordance with some embodiments.

FIG. 9 shows another exemplary encryption module 200 that may be incorporated into the sequences of FIGS. 6-7. In some embodiments, the encryption module 200 corresponds to the second encryption module 152, and employs counter (CTR) mode encryption. The encryption of module 200 uses one or more input auxiliary values based on physical address information associated with the input data.

A counter value generator 202 generates an input count value. In some embodiments, this count value is generated from a combination of the physical address of the memory location to which the data are to be written, and a write count of writes and/or erasures that have taken place to said location. For example, the count value could be a 20 bit write count value added to a 44 bit physical address value, repeated twice, and concatenated to a final desired size (e.g., 128 bits). The 20 bit write count value may be derived from the associated metadata (portion 138, FIG. 5). The 44 bit physical address value may identify the physical location in memory in terms of various addressing parameters such as die, stripe, erasure block, page (row number), starting bit location, etc.

Generating the counter value in this way helps ensure that each count value will be unique, and can be easily reconstructed during a subsequent decryption event. This exemplary scheme also allows data associated with the same LBA to be stored to different pages in the same erasure block. Other forms of counter values can be used, including counter values that do not include any physical address information at all (e.g., neither write counts nor physical block addresses, etc.).

The count value is subjected to a block cipher encryption operation by encryption block 204. The cipher used by block 204 may be the same as, or different from, the cipher of block 182 in FIG. 8. The cipher of block 204 utilizes a second input value which, as desired, can incorporate physical address information associated with the target page (e.g., write count value, PBA, etc). For reference, the count value and the second input value are each considered exemplary forms of auxiliary data values for the module 200. Encryption algorithms that use a single auxiliary data value can be used.

The output ciphertext from block 204 is combined using an XOR function 206 with the single encrypted data 190 output by the system 170 of FIG. 8. The output of the XOR function 206 provides double (second) encrypted data 208, which are then stored to an appropriate memory location as discussed above in FIGS. 6-7.

The physical address information associated with the second encryption level in the various encryption schemes disclosed herein can take any number of forms, such as a physical address (block, page, bit range, etc.), a time/date stamp associated with the write event, a write count, or some other internally generated value uniquely associated with the target location in the memory. In at least some embodiments, the second level of encryption can further use an internally generated global auxiliary data (such as a global key) that is applied on all second level encryptions to all locations in the array. Different global keys can be generated for different portions (bands) of the array. It is contemplated that such global keys (or other forms of global auxiliary data) will be generated internally and remain essentially undiscoverable by outside attack.

The exemplary cascaded encryption presented by FIGS. 6-9 enhances data security including on the basis that the second encryption uses a hidden auxiliary data value, known only to the internal circuitry of the data storage device 100, and which is not easily accessible by an attacker. Preferably, the hidden data value is independent from any other of the data encryption values used to encrypt the data.

The security requirements for the second level of encryption can be less stringent than those for the first layer, since no chosen or plaintext attacks appear to be feasible upon the double encrypted data. Thus, counter mode encryption as exemplified in FIG. 9 may be a suitable choice for the second level of encryption, although other modes can readily be used.

Counter (CTR) mode is particularly suitable because it is simple, fast and parallelizable. CTR mode decryption can be carried out using the same encryption core. CTR mode is believed to be sufficiently secure when already encrypted data are protected to hide equality of data blocks. Some plaintext header information can be attached to the stored blocks as desired. The counter values will always be different, so there will be no leakage of the header information, even if only differing by one bit.

If an attacker flips a bit of the header part of the stored data, the corresponding decrypted header will have a flipped bit. In this way, known changes can be made to the header when the attacker correctly guesses the header position, which can be a non-negligible danger. However, it is believed that the header information, even if discovered, will not leak any useful information about the associated user data or encryption applied thereto.

In further embodiments, double tweaked wide encryption is another suitable encryption approach. This approach reduces the possibility of duplicate ciphertext blocks. Altering the ciphertext using double tweaked wide encryption generally results in the randomization of a large amount of decrypted plaintext.

In one approach, a double tweaked LION cipher can be used, which provides a good tradeoff between security and speed (core size). This approach uses two stream ciphers. The first stream cipher is tweaked by the LBA and uses a user input (band) key. The second stream cipher is tweaked by physical address information and is further keyed by a global hidden key. There can be a hash stage in between the two ciphers, which further tweaks the initialization of the second cipher.

In another approach, an Encryption-Mix-Encryption mode is used. A layer of XTS mode encryption can be implemented, tweaked by the encrypted LBA and by the positions of cipher blocks inside the logical blocks, using the user's band key. A mixing layer can be used to process the output blocks of the first layer. The mixing layer can be chosen from any number of suitable constructions known in the art.

A suitable function is the EME2 mix function, which reduces the security bound to $2^{64}$ sectors encrypted with the same key. A 256 bit mix version of the EME2 cipher could be used, which offers a security bound of $2^{128}$ encryptions. A Pseudo-Hadamard transform could also be employed, as well as other alternatives which will readily occur to the skilled artisan in view of the present disclosure. A second layer of XTS mode can then be applied, tweaked by a write count and physical address information, and by the position of the cipher blocks therein.

Figure 10:
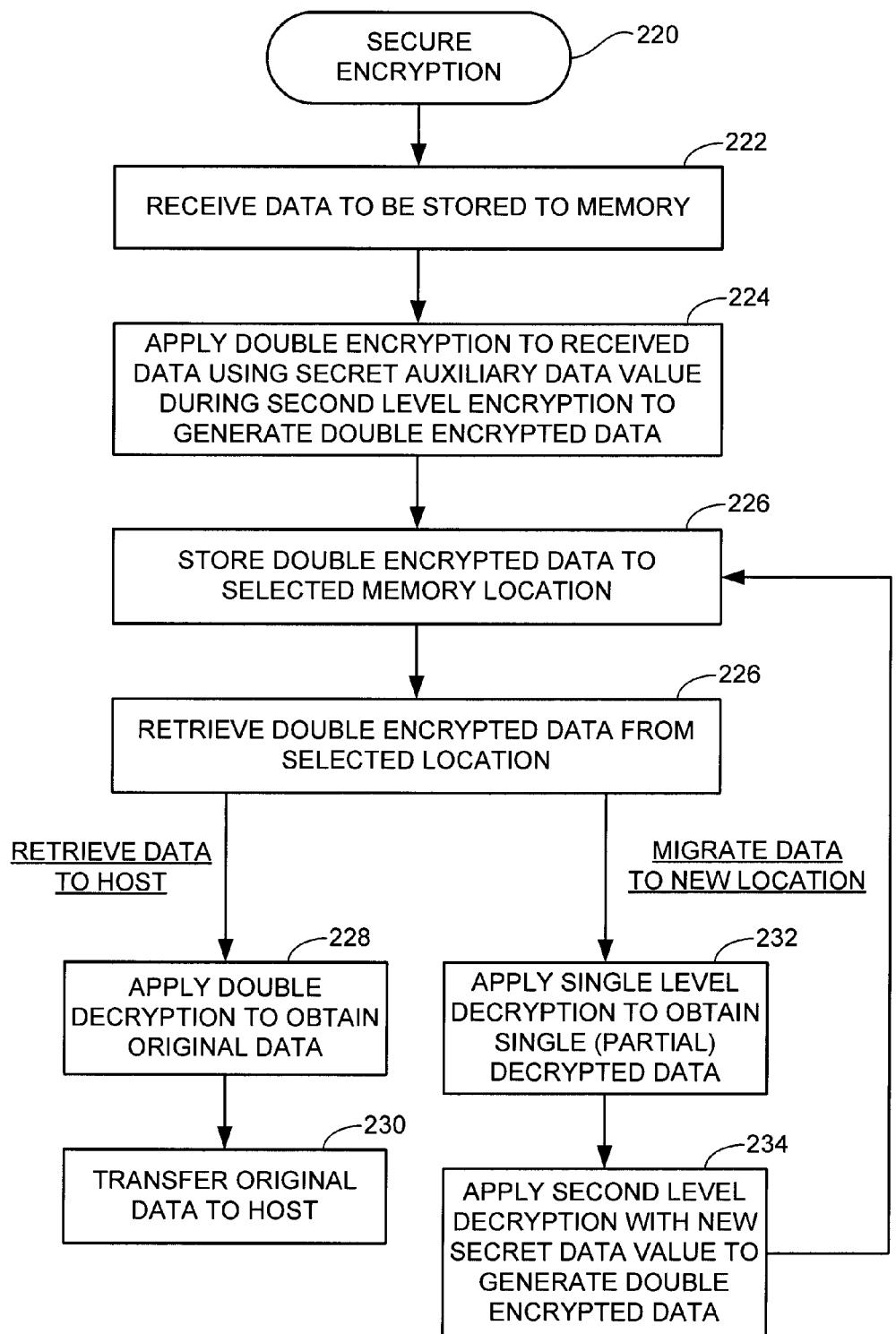
FIG. 10 is a CASCADED ENCRYPTION routine generally illustrative of steps carried out in accordance with various embodiments.

FIG. 10 provides a flowchart for a CASCADED ENCRYPTION routine 220 to summarize the foregoing discussion. Data to be stored to a memory are received at step 222. These data may be user data supplied by a host, in which case the data may be supplied in conjunction with a write command that includes logical addressing, such as an associated LBA.

Double encryption is applied to the data at step 224 as discussed above. In some embodiments, the first level of encryption will use the LBA associated with the data as a first auxiliary data value. The second level of encryption will use the physical block address (PBA) associated with the selected target location for the data as a second auxiliary data value. The resulting double encrypted data are stored in the selected memory location at step 226.

The data are subsequently retrieved from the selected location responsive to an operation by the device 100. The data may be retrieved responsive to a host request to return the data previously stored in step 226. Alternatively, the data may be retrieved for other reasons, such as to migrate the data to a new location in the memory.

During a host data retrieval operation, the flow passes to step 228 in which double decryption is applied to the data, and the recovered plaintext is returned to the host, step 230. During a data migration operation, single level decryption is applied at step 232, and a new second level of encryption is employed at step 234. The newly encrypted data are thereafter written to the new target memory location.

Figure 11:
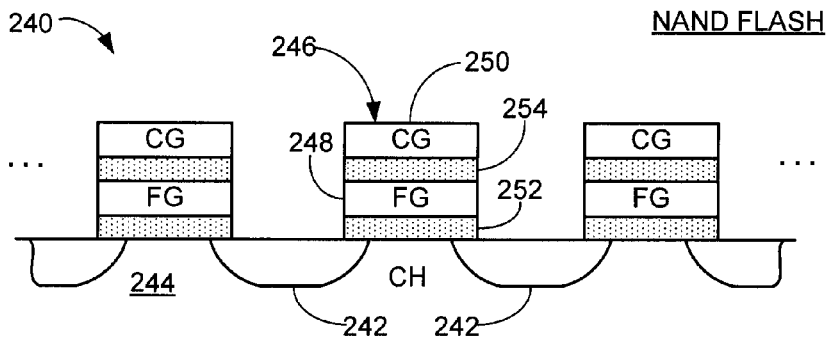
FIG. 11 shows an exemplary format of the memory of the device of FIG. 1 as an array of flash memory cells.

Benefits associated with the cascaded encryption process of FIG. 10 in the context of a flash memory array can be understood with reference to FIG. 11, which illustrates a number of flash memory cells 240. The memory cells are arranged in a NAND configuration and include localized doped regions 242 in a semiconductor substrate 244. A gate structure 246 is provided between each adjacent pair of the doped regions 242 so that each cell takes a general nMOSFET configuration.

Each gate structure 246 includes a floating gate (FG) 248, a control gate (CG) 250 and intervening isolation regions 252, 254. Data are stored by accumulating charge on the floating gate 248. The presence of accumulated charge raises the threshold voltage required on the control gate 250 place the cell in a drain-source conductive state across channel CH. A separate erasure operation is required to remove accumulated charge from the floating gate.

The cells can be configured as multi-level cells (MLC) through the storage of multiple states. For example, four different levels of accumulated charge (from substantially no charge to a maximum level of charge) can be used to enable each MLC to store 2 bits of data (e.g., 11, 10, 01, 00). Due to the need to carry out a separate erasure operation to remove the storage state of previously programmed cells, it will readily apparent that the cascaded encryption operation discussed in FIG. 10 will ensure that each version of the same plaintext (or modified versions thereof) stored in different locations will have been subjected to a different encryption mechanism.

Moreover, a variety of laboratory techniques are available to a motivated attacker and can be used to detect previously stored states of the flash memory cells 240, even after multiple erasures and data overwrites have been applied. Accordingly, the cascaded encryption of FIG. 10 can further enhance data security by using different encryption mechanisms upon multiple copies of the same plaintext data that were stored in different locations in the array.

Figure 12:
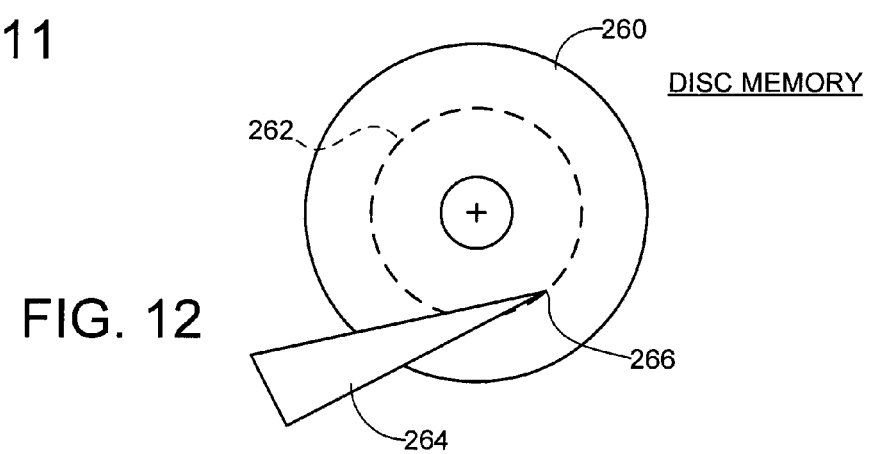
FIG. 12 shows an exemplary format of the memory of the device of FIG. 1 as a rotatable storage medium.

While the foregoing embodiments have been directed to flash memory cells, it will be appreciated that the cascaded encryption discussed above can be readily adapted for other types of memory. FIG. 12 shows a disc memory 260 to which the cascaded encryption of FIG. 10 can be readily applied. The disc 260 stores data in the form of magnetization transitions along concentric tracks 262 defined on the disc recording surface. A moveable actuator 264 is used to align a data read/write transducer 266 with the respective tracks to read data from and write data to the tracks.

Double encryption as disclosed herein can be applied in a variety of ways to data written to the respective tracks. In some embodiments, the tracks are divided up into a number of concentric zones, with each zone having an associated band key that is incorporated in the first level of encryption to all the data stored in that zone. The second level of encryption can incorporate physical address information such as disc surface, band, track number, angular location, time/date stamp, write counts and so on, as before.

Figures 13, 14:
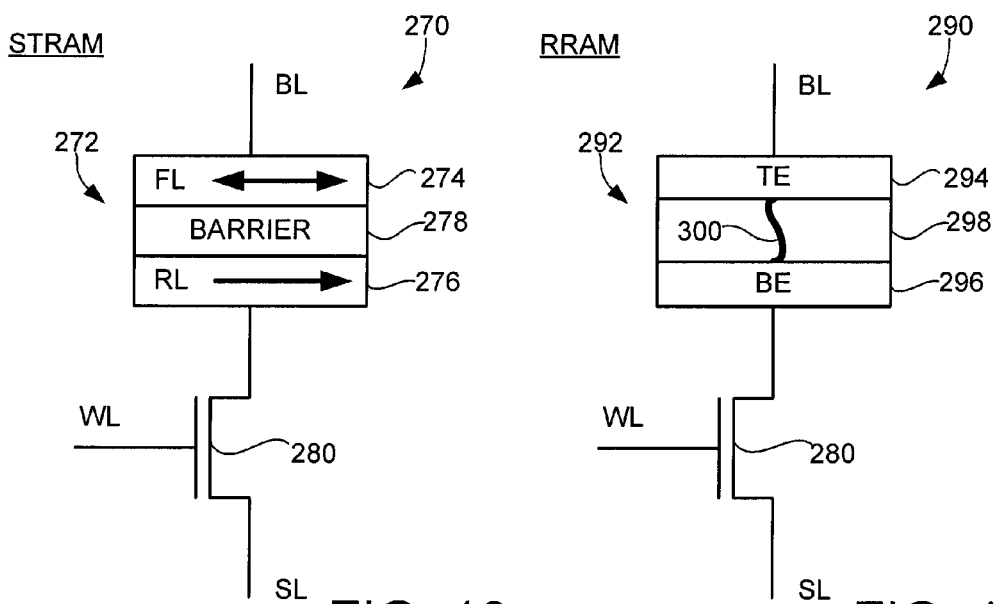
FIG. 13 shows an exemplary format of the memory of the device of FIG. 1 as an array of spin-torque transfer random access memory (STRAM) cells.
FIG. 14 shows an exemplary format of the memory of the device of FIG. 1 as an array of resistive random access memory (RRAM) cells.

FIG. 13 shows another memory configuration in which the cascaded encryption set forth herein can be readily implemented. The memory is formed from an array of spin-torque transfer random access memory (STRAM) cells 270. Each memory cell comprises a magnetic tunneling junction 272 with a variable magnetization free layer 274, a fixed magnetization reference layer 276, and an intervening barrier layer 278. The MTJ 272 is in series with a switching device 280, characterized as an nMOSFET.

Data are stored by the MTJ 272 in relation to the orientation of the free layer 274 relative to the reference layer 276. Generally, the MTJ 272 may exhibit a lower relative electrical resistance in a parallel state, and a higher electrical resistance in an antiparallel state. The programmed state of the cell 270 can be sensed in relation to a voltage drop across the cell responsive to a low magnitude read current.

FIG. 14 sets forth another memory configuration in which the disclosed cascaded encryption can be used. The memory constitutes an array of resistive random access memory (RRAM) cells 290. Each cell has a programmable resistive element 292 formed from opposing electrodes 294, 296 and an intervening oxide layer 298. A filament 300 can be selectively formed across the oxide layer (and subsequently removed) to alter the overall resistance of the memory cell 290. As before, the element 290 can be placed in series with a switching device 280 to provide selective access to the individual cells.

It will be appreciated that the various embodiments of the present invention can provide benefits over the existing art. Cascaded encryption using a hidden key tied to the physical address of the memory can ensure that different copies/versions of selected plaintext will be subjected to different encryption mechanisms.

During the encryption and decryption process involved in migrating the data to a new location, the data remain partially encrypted (that is, the data are only partially decrypted) before being re-encrypted. This adds further security in that an attacker may not be able to determine the encryption mechanism by inducing migration (e.g., a copy function) of data to a new location, nor discover the underlying plaintext during said migration.

While a variety of types and styles of memories have been disclosed, such are merely exemplary as the various techniques set forth herein can be adapted to a wide variety of applications and environments. Similarly, while a variety of types and styles of ciphers and keys have been disclosed, such are merely exemplary as the various techniques set forth herein can be adapted or modified as desired, without limitation, depending on the requirements of a given application. Nothing disclosed in the foregoing illustrative embodiments is intended or contemplated as being necessary for implementation or limiting to the scope of the claimed subject matter.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed.

What is claimed is:

1. A method comprising:
    receiving input data to be secured in a non-volatile memory against unauthorized access by an attacker;
    encrypting the input data in relation to a first auxiliary data value to provide first level ciphertext, the first auxiliary data value comprising a logical block address (LBA) value associated with the input data;
    subsequently encrypting the first level ciphertext in relation to a second auxiliary data value associated with a selected physical location in the non-volatile memory to provide second level ciphertext, the second auxiliary data value comprising a physical block address (PBA) of the selected physical location in the non-volatile memory;
    storing the second level ciphertext to said selected physical location in the non-volatile memory to secure the input data from said unauthorized access by an attacker; and
    subsequently migrating the secured input data from the selected physical location to a second selected physical location in the non-volatile memory by partially decrypting the second level ciphertext to recover the first level ciphertext from the selected physical location without recovering the corresponding input data in an unencrypted form, re-encrypting the recovered first level ciphertext using a third auxiliary data value associated with the second selected physical location to provide third level ciphertext, and storing the third level ciphertext in the second selected physical location while the second level ciphertext remains stored in the selected physical location in the non-volatile memory.

2. The method of claim 1, further comprising a subsequent step of erasing the selected physical location to remove the second level ciphertext stored therein.

3. The method of claim 1, in which the subsequently encrypting step comprises counter (CTR) mode encryption which uses a seed count value that includes physical address information associated with the selected physical location in the non-volatile memory.

4. The method of claim 1, in which the encrypting and subsequently encrypting steps utilize a mixing layer between the respective encryption steps.

5. The method of claim 1, in which the non-volatile memory comprises a flash memory array of flash memory cells.

6. The method of claim 1, in which the non-volatile memory comprises a selected one of a disc memory, an array of spin-torque transfer random access memory (STRAM) cells, or an array of resistive random access memory (RRAM) cells.

7. The method of claim 1, in which the non-volatile memory forms a portion of a data storage device comprising a data storage controller, the input data and the first auxiliary data value are both supplied by a host device in communication with the data storage device, and the data storage controller generates the second auxiliary value independently of the first auxiliary value.

8. The method of claim 1, further comprising:
    dividing the non-volatile memory into a plurality of bands each comprising a plurality of available physical locations for the storage of encrypted data;
    assigning a unique second auxiliary data value to each of the plurality of bands;
    identifying the second auxiliary data value assigned to the band which includes the selected physical location; and
    using the identified second auxiliary data value to subsequently encrypt the first level ciphertext to provide the second level ciphertext.

9. A method comprising sequential steps of:
    receiving from a host device input data to be secured in a non-volatile memory against unauthorized access by an attacker, the input data presented as unencrypted plaintext;
    applying multi-level encryption to the input data in relation to a first auxiliary data value associated with a first physical address in the non-volatile memory to generate a first set of ciphertext, wherein the multi-level encryption comprises applying a first level of encryption using a logical block address (LBA) value associated with the input data and then applying a second level of encryption using a physical block address (PBA) value associated with the first physical address in the non-volatile memory;

storing the first set of ciphertext to said first physical address in the non-volatile memory to secure the input data from said unauthorized access by an attacker;

decrypting the first set of ciphertext using the first auxiliary value to provide partially decrypted ciphertext that remains encrypted by at least one level of said multi-level encryption;

re-encrypting the partially decrypted ciphertext in relation to a different, second auxiliary data value associated with a different, second physical address in the non-volatile memory to generate a second set of ciphertext; and writing the second set of ciphertext to the second physical address in the non-volatile memory responsive to the first set of ciphertext remaining stored in the first physical address in the non-volatile memory to secure the second set of ciphertext from unauthorized access by an attacker, wherein the input data is not decrypted into the presented unencrypted plaintext until a request for the input data is subsequently received from the host device.

10. The method of claim 9, in which the first physical address in the non-volatile memory comprises a first page in a flash memory array, and the second physical address in the non-volatile memory comprises a second page in the flash memory array.

11. The method of claim 9, in which the first physical address in the non-volatile memory is disposed within a first erasure block of a flash memory array, and the second physical address in the non-volatile memory is disposed within a different, second erasure block of the flash memory array.

12. The method of claim 9, in which the decrypting, re-encrypting and writing steps are carried out responsive to a garbage collection operation in which the first physical address in the non-volatile memory is prepared for an erasure operation.

13. An apparatus comprising a non-volatile memory and a controller adapted to, responsive to receipt of input user data from a host device in the form of unencrypted plaintext for secure storage in the non-volatile memory against unauthorized access by an attacker, apply a first level encryption to said input user data in relation to a first auxiliary data value provided by the host device to generate first set of ciphertext, to apply a second level encryption to the first set of ciphertext in relation to a second auxiliary data value associated with a first physical location in the non-volatile memory to generate a second set of ciphertext as double-encrypted data, and to direct storage of the second set of ciphertext to said first physical location in the non-volatile memory, wherein the first auxiliary data value comprises a logical block address (LBA) value associated with the input data and the second auxiliary data value comprises a physical block address (PBA) value associated with the first physical location in the non-volatile memory, wherein the controller is further adapted to subsequently perform a migration operation to store encrypted data corresponding to the input user data to a different, second location by decrypting the second set of ciphertext using the second auxiliary data value to provide the first set of ciphertext, re-encrypting the decrypted first set of ciphertext in relation to a different, third auxiliary data value associated with a different, second physical location in the non-volatile memory to generate a third set of ciphertext, and to direct storage of the third set of ciphertext to the second physical location in the non-volatile memory, wherein the received unencrypted plaintext is not recovered during the generation and storage of the third set of ciphertext.

14. The apparatus of claim 13, in which the second set of ciphertext remains stored in the first physical location in the non-volatile memory, and the controller subsequently directs an erasure operation upon the first physical location to remove the second set of ciphertext therefrom.

15. The apparatus of claim 13, characterized as a flash memory data storage device, the first physical location in the non-volatile memory comprising a selected page in a flash memory array of the flash memory data storage device.

* * * * *